(12) United States Patent
Kocher et al.

(10) Patent No.: US 11,874,909 B1
(45) Date of Patent: Jan. 16, 2024

(54) TWO-PHASE BIOMETRIC ACCESS CONTROL SYSTEM (TBACS)

(71) Applicants: Robert William Kocher, McLean, VA (US); Douglas Earl Dyer, Herndon, VA (US); John Shelly Bowling, II, Reston, VA (US)

(72) Inventors: Robert William Kocher, McLean, VA (US); Douglas Earl Dyer, Herndon, VA (US); John Shelly Bowling, II, Reston, VA (US)

(73) Assignee: Ideal Innovations, Inc., Arlington, VA (US)

( * ) Notice: Subject to any disclaimer, the term of this patent is extended or adjusted under 35 U.S.C. 154(b) by 447 days.

(21) Appl. No.: 17/238,580

(22) Filed: Apr. 23, 2021

(51) Int. Cl.
| | | |
|---|---|---|
| *G06F 21/32* | (2013.01) | |
| *G06F 21/35* | (2013.01) | |
| *G06F 21/55* | (2013.01) | |
| *B60R 25/25* | (2013.01) | |
| *B60R 25/24* | (2013.01) | |
| *G07C 9/25* | (2020.01) | |
| *B60R 25/102* | (2013.01) | |

(52) U.S. Cl.
CPC ............ *G06F 21/32* (2013.01); *B60R 25/102* (2013.01); *B60R 25/245* (2013.01); *B60R 25/25* (2013.01); *G06F 21/35* (2013.01); *G06F 21/554* (2013.01); *G07C 9/257* (2020.01); *B60R 2325/105* (2013.01); *B60R 2325/205* (2013.01); *G06F 2221/2113* (2013.01); *G06F 2221/2137* (2013.01); *G06F 2221/2153* (2013.01)

(58) Field of Classification Search
CPC ........ G06F 21/32; G06F 21/35; G06F 21/554; G06F 2221/2113; G06F 2221/2137; G06F 2221/2153; B60R 25/102; B60R 25/245; B60R 25/25; B60R 2325/105; B60R 2325/205; G07C 9/257
See application file for complete search history.

(56) References Cited

U.S. PATENT DOCUMENTS

| | | | | |
|---|---|---|---|---|
| 2020/0023812 A1* | 1/2020 | Hassani | .............. | H04L 63/0861 |
| 2021/0226948 A1* | 7/2021 | Whitman | .............. | H04W 12/06 |

* cited by examiner

*Primary Examiner* — Mohammad W Reza

(57) ABSTRACT

Current biometric access control systems rely on a biometric sensor at the access control point, a design which has shortcomings on throughput or biometric image quality, which is a particularly important limitation for vehicle traffic, particularly when vehicles do not stop. We disclose a Two-Phase Biometric Access Control System (TBACS) that includes biometric, multi-factor authentication in which the biometric sensor is not required to be at the access control point, the access authorization decision is made prior to arriving, and the access confirmation is verified at the access control point using a rapidly-read token that identifies the person seeking access.

14 Claims, 5 Drawing Sheets

Two-phase Biometric Access Control System

TWO-PHASE BIOMETRIC ACCESS CONTROL SYSTEM (TBACS)

CROSS-REFERENCE TO RELATED APPLICATIONS

None.

FEDERALLY SPONSORED RESEARCH

None.

BACKGROUND

Field of the Invention

The invention relates to a Two-Phase Biometric Access Control System (TBACS) that includes biometric, multi-factor authentication in which the biometric sensor is not required to be at the access control point, the access authorization decision is made prior to arriving, and the access confirmation is verified at the access control point using a rapidly-read token that identifies the person seeking access.

Description of the Related Art

For access control systems that use multiple authentication factors including a biometric, the current state of the art requires a biometric sensor at the point of access. Normally, this either results in a delay at the point of access to give the biometric sensor enough time to get a good image, or, alternatively, the biometric sensor might work quickly but at the cost of reduced or unreliable image quality. Thus, current systems either suffer from poor throughput or increased probability of false negatives and false positives, inconveniencing authorized persons and compromising security, respectively. Furthermore, with current vehicle access control systems, a person's information is collected, and the access authorization decision made at a single time and place: when the person arrives at the access control point. For security guards making access authorization decisions, working this way seems difficult and particularly stressful when traffic backs up, putting pressure on security guards to make good decisions quickly. The situation can also be stressful to persons desiring entry through the access control point because they worry that they may be denied entry because of some problem that they don't yet know about and may not have time to react to. Furthermore, external events can impact the guard's authorization decisions, and in retrospect, some previous authorizations decisions might have been inappropriate or might have been made differently had there been more time.

To improve throughput of vehicles, ideally the access control system would not require the vehicles to stop, but doing that implies a poor biometric image quality or an unreliable biometric image from a biometric sensor at the access control point, false negatives and false positives, and thus inconvenience and reduced security, respectively.

When the biometric sensor is located at the access control point, the sequence of persons passing through must be tightly controlled. If there is any distance between the biometric sensor and other equipment that is used to identify a person, people cannot get out of order or their information can become mixed up with information of another person. That means people have to line up and stay in their line. If in vehicles, each person must stay in their lane. This reduces any efficiency that might otherwise be gained though more flexible use of resources in a shorter line or shorter lane.

Finally, current access control systems that make decisions at the access control point require distribution of all of the information necessary to make those decisions, including information about authentication factors and entry criteria. Maintaining the consistency of this information at many different locations is technically difficult, inefficient, and costly. If a biometric is included in the authentication factors and a biometric match is performed at the location's access control point, then there is the added cost of distributing the biometric matching algorithm and the processing power to run it at all the access control points.

Accordingly, there is a need to overcome the above-identified problems existing in the current state of the art.

SUMMARY OF THE EMBODIMENTS

TBACS is a two-phased method for secure access control as well as a system supporting this two-phased method. In the first phase, which occurs prior to arriving at the access control point and may be any distance from it, a person desiring access uses the system to securely provide multiple authentication factors including a biometric in an access request for a particular location. A system server receives the request, authenticates the person based on a preexisting database, and checks to see if the person has the authority for access based on fixed criteria provided by the location. If there are any problems with authentication or authorization, the server sends a problem message back to the person. Otherwise, the server sends a confirmation message authorizing the person's access to both the person and to a computer at the location's access control point. The confirmation message includes a token code which is unique to the person. This completes the first phase, and most of the work is done. In the second phase, the person arrives at the access control point and presents their token which is rapidly and reliably read by a token reader at the access control point, and, afterward, the token code is available to the computer at the location's access control point. The computer uses the token code to checks to see if it has received an associated access confirmation. If so, the computer activates automated access control equipment, enabling the person to pass through the access control point. Otherwise, the person is denied access and must seek assistance from a security guard. To ensure that no unauthorized person can enter, undetected, without a confirmation, TBACS protects the token, limits the confirmation, or tracks the confirmation. In an embodiment, the token code is maintained as a secret. In another embodiment, the confirmation is valid only during a limited time window which an unauthorized person might not know. In another embodiment, the location computer checks for attempted multiple uses of a confirmation to detect that an unauthorized person is attempting to enter or has entered.

REFERENCE NUMERALS

Figure 1:
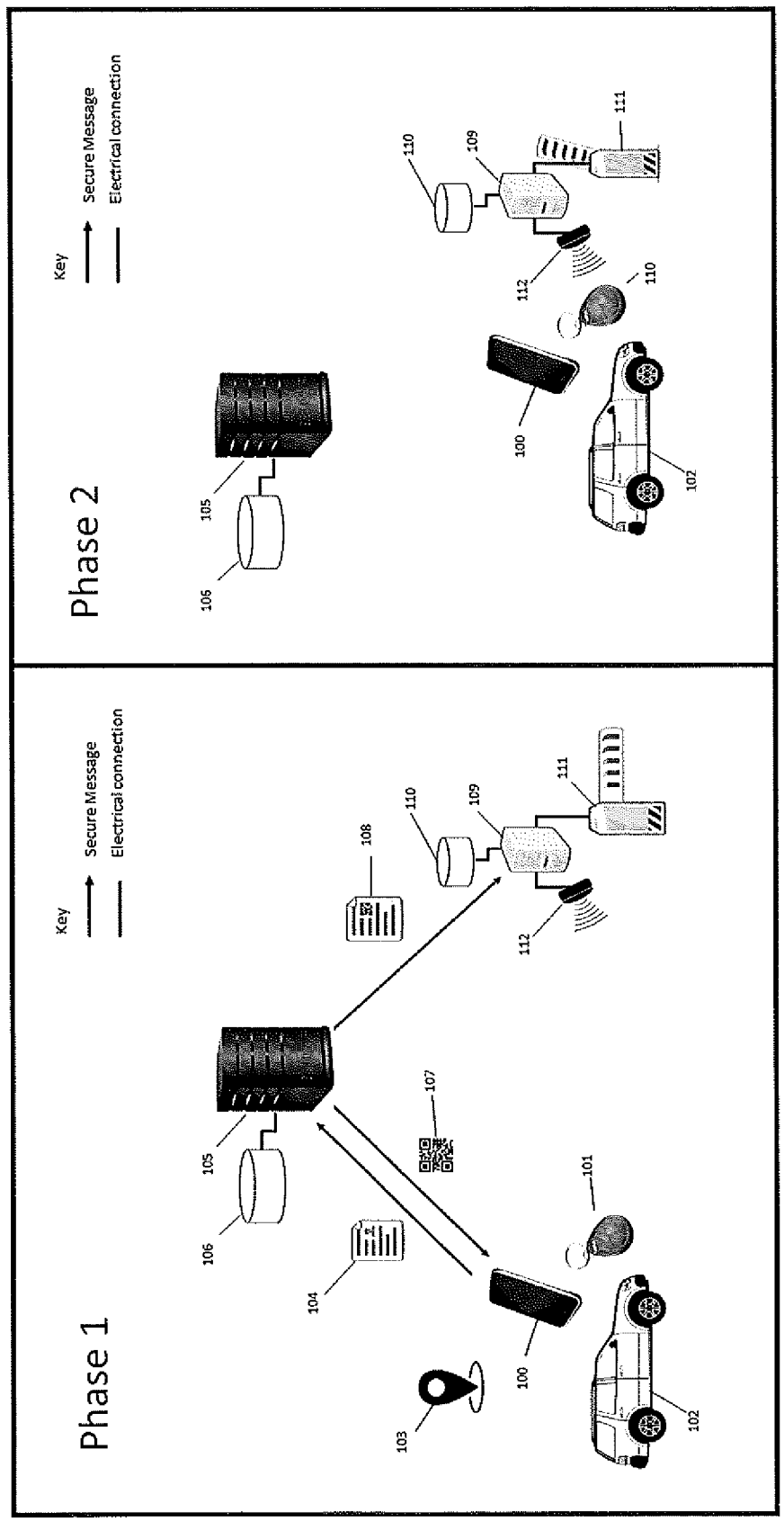
FIG. 1 depicts system components and data flow in TBACS, Phase 1 and Phase 2.

Item 100 is a personal device that includes an interactive display and text input, secure communications capability, and a biometric sensor.

Item 101 is a readable token that, when read, provides a unique token code that may be used to identify a person who has the token.

Item 102 is a vehicle that is not part of TBACS but sets context for TBACS in some embodiments; TBACS may be used by a person either in a vehicle or on foot.

Item 103 is an event that is not part of TBACS but might prompt a person to request access in some embodiments or, in other embodiments, might automatically initiate an access request on behalf of the person.

Item 104 is an access request for a location sent securely from personal device 100; the access request contains the location, the person's identity number, and multiple authentication factors, including a biometric, for the person.

Item 105 is a network-connected server with a biometric matching algorithm and a preexisting database of authentication information necessary to verify the identity of a person as well as the person's token code and criteria, previously set by said location, for determining whether or not said person has the authority to enter a location.

Item 106 is the preexisting database of authentication information necessary to verify the identity of a person as well as the person's token code and criteria, previously set by said location, for determining whether or not said person has the authority to enter a location; although drawn separately, it is part of the server 105.

Item 107 is a response message sent by server 105 to personal device 100 in response to access request 104; if the server verifies that the person sending the access request is authorized access, then the response message is an access confirmation, else it is a message describing the reason why the person is not receiving an access confirmation.

Item 108 is the access confirmation 107 and the token code associated with the person which is forwarded from server 105 to computer 109 if response message 107 is an access confirmation.

Item 109 is a computer at the location's access control point.

Item 110 is a database that is a part of computer 109 and which stores the access confirmation and associated token code for an authorized person who has requested access.

Item 111 is access control equipment, controlled by computer 109, that can physically permit or deny access to a person seeking entry through the location's access control point.

Item 112 is a token reader, connected to computer 109, that is able to read a person's token code and provide it to computer 109 when the token is in close proximity.

DETAILED DESCRIPTION OF THE EXEMPLARY EMBODIMENTS

An advantage of one or more aspects of TBACS is that, by doing most of the work in the first phase, there is very little to do at the access control point, so throughput can potentially increase. If problems occur, they may be solved before arriving at the access control point. This reduces workload on security guards and lowers their stress level. Moreover, a person seeking access knows in advance if they are authorized access, reducing the person's stress level too. Furthermore, security is potentially improved because security guards know, in advance, that the person plans access. If an external security-related event occurs that affects the location or the person's access, security guards have more time to react appropriately.

Another advantage of one or more aspects of TBACS is that the biometric sensor us used in the first phase and therefore does not need to be at the access control point. The practical utility is that the biometric sensor may be tailored for capturing good biometric images without having to do so at the access control point, and this is particularly helpful in embodiments involving vehicle traffic that, for best throughput, pass through the access point securely, on-the-move, without stopping.

Because the token is rapidly and reliably read, another advantage of one or more aspects of TBACS, in embodiments involving vehicle traffic, is that it's possible to support secure access on-the-move without, requiring a vehicle to stop. This can greatly improve access throughput without reducing security because of false-positives or false-negatives from the biometric sensor.

Another advantage of one or more aspects of TBACS is that the, because two phases are used, the sequence of persons passing through the access control point is independent of the sequence of authorization decisions. In the context of multiple pathways at the access control point, the practical utility is that any pathway works. In contrast, without two phases, the sequence of persons passing through the access control point must be tightly controlled to maintain the association between a person and their access control information.

Another advantage of TBACS is centralizing the access control decisions which means that authentication information and entry criteria can be maintained at one location rather than many. This is technically easier, more efficient, and cheaper than maintaining the same information at many access control points. Furthermore, the biometric matching algorithm in TBACS is centralized along with the processing power to run it which is also cheaper and technically easier. Using centralized decision-making enables TBACS to attain economy of scale. With TBACS, it is possible to centralize access control decision-making over a very large number of access control points, potentially all of them in a nation or even the world. Each location can still tailor its entry criteria at any time.

Figure 2:
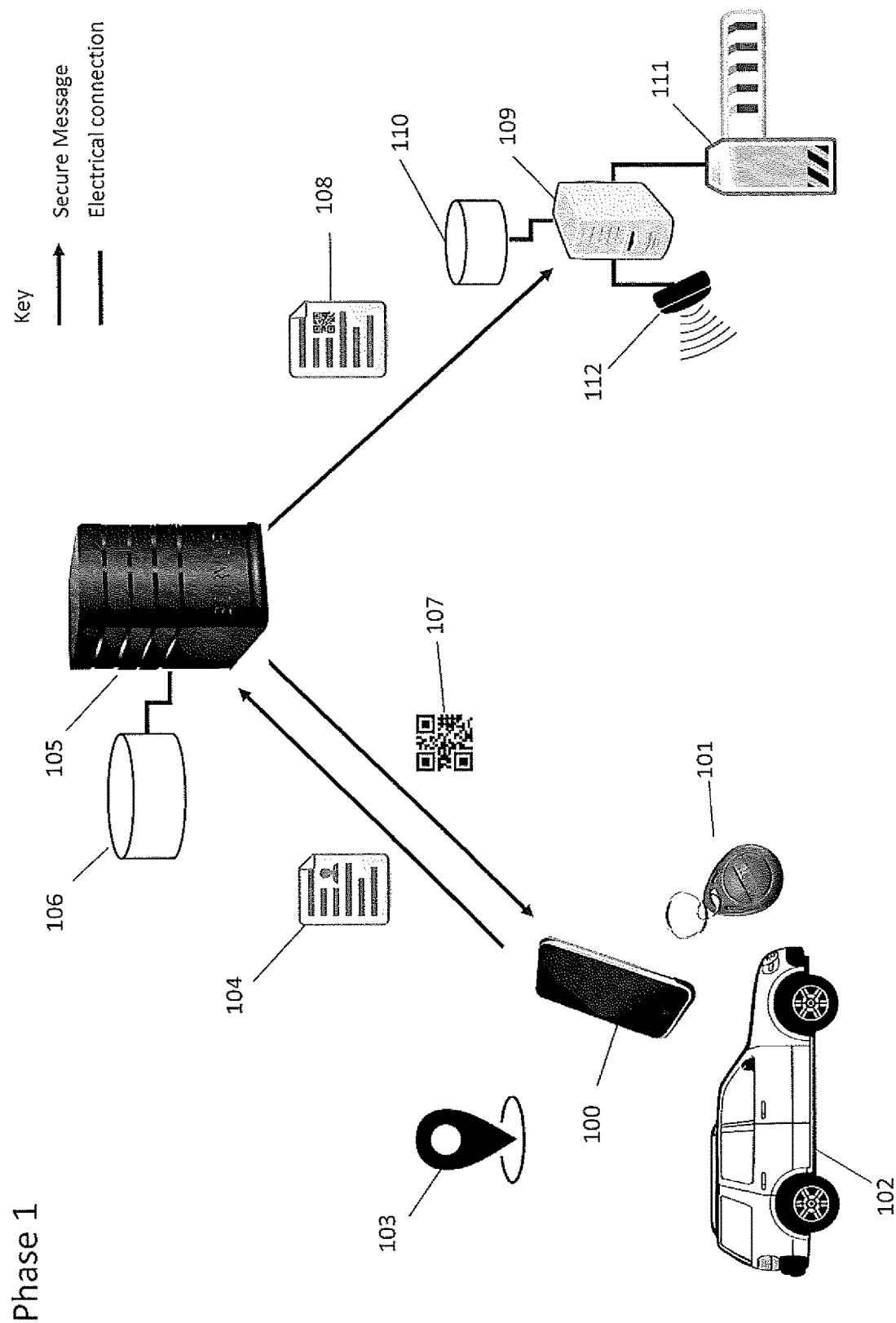
FIG. 2 depicts system components and data flow in TBACS, Phase 1.
Figure 3:
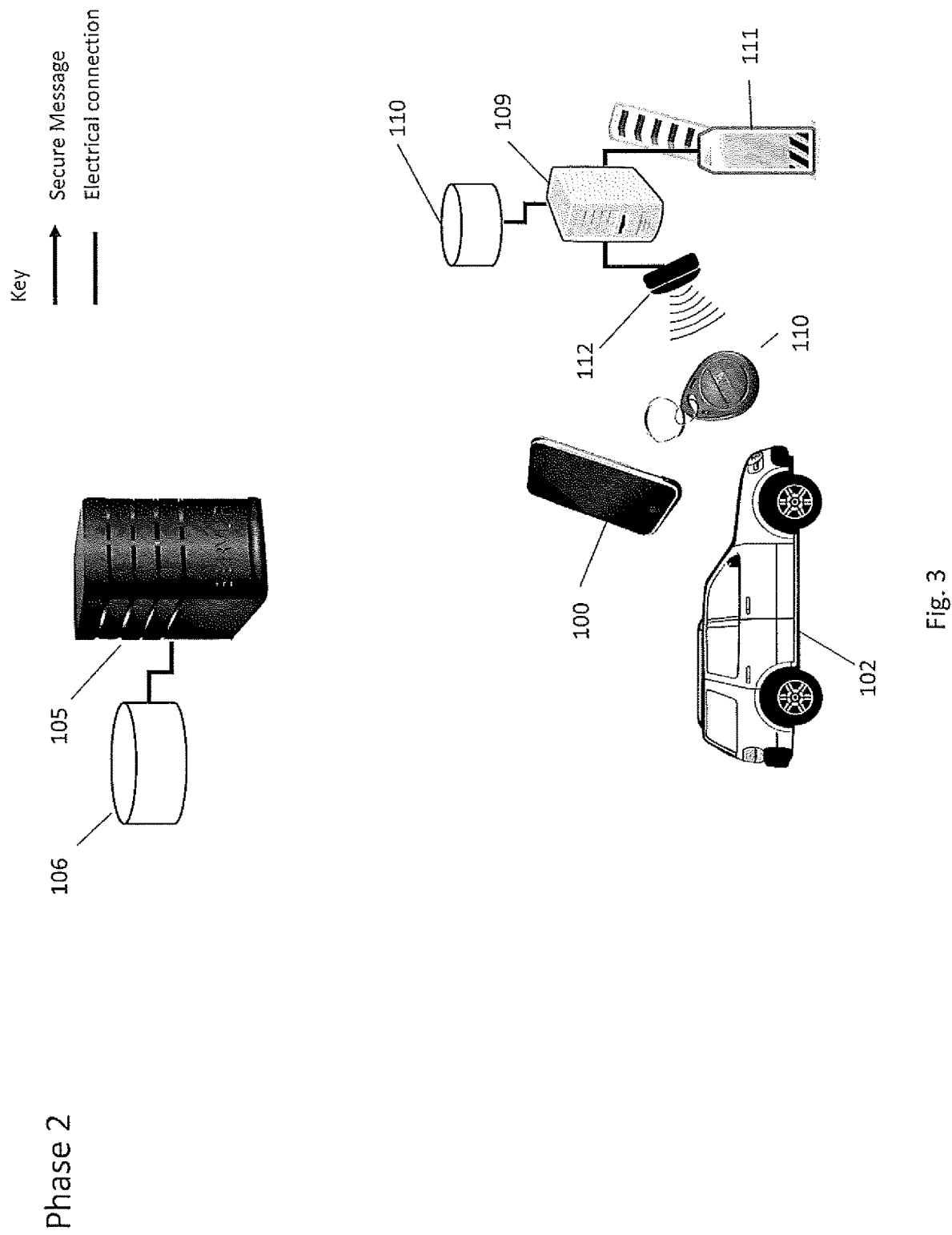
FIG. 3 depicts system components and data flow in TBACS, Phase 2.

FIG. 1 shows the two phases of TBACS with TBACS equipment, and these two phases are shown larger in FIG. 2 and FIG. 3, respectively. Phase 1 occurs before arrival and some distance from the location's access control point. The access control point is typically on the border of the location's area. It is used to control the flow of persons into the location, permitting access to those persons who are authorized while denying access to everyone else.

Turning to FIG. 2, in Phase 1, in an embodiment, some external event 103, not part of TBACS, triggers an access request or motivates a person to initiate an access request. In an embodiment, the person plans to arrive at the location in a vehicle 102, not part of TBACS. In another embodiment, the person plans to travel on foot as a pedestrian. In an embodiment, the person seeking entry to a location requests access using personal device 100 by providing authentication factors that will be used to verify the person's identity by server 105. In an embodiment, the person enters a secret personal identification number (PIN) or password as one authentication factor. In an embodiment, the personal device also has a secret code which is another authentication factor, or, in another embodiment, the secret code is used to create another authentication factor using an algorithm based on the current time. The personal device also captures a biometric image of the person as an authentication factor. In an embodiment, the biometric is a face photo. The person also has a readable token 101 that, when read, provides a unique token code. In an embodiment, the token code is not used as an authentication factor in Phase 1.

In FIG. 2, when all authentication factors have been provided, the personal device 100 sends them, along with the location and person's identity number, to server 105 in the form of a secure access request message 104. In an embodiment, the person initiates sending the access request 104 using personal device 100. In another embodiment, personal device 100 sends the access request 104 automatically as soon an all authentication factors are provided. The server has a biometric matching algorithm and includes a preexisting database 106 that has information necessary to verify the person's identity using all authentication factors. In an embodiment, the server checks to see if the person's PIN or password match, tests the personal device code, and compares the biometric image with an authoritative biometric image of the person. In an embodiment, the biometric image is a face photo, and the biometric matching algorithm is a facial recognition algorithm. If the server 100 finds information for the person's identity number in its database 106 and if all authentication factors match, then the server has verified the person as being, in fact, who they claim to be, that is the person associated with the identity number in the access request 104, and authentication is complete. Otherwise, the server cannot identify the person.

In FIG. 2, if the server 105 has verified the person's identity, then server 105 retrieves from preexisting database 106 the entry criteria previously established by the location. In an embodiment, the criteria are in the form of an access control list of persons allowed to enter. In another embodiment, the criteria are a set of business rules that relate to the information in the preexisting database 106 about the person. If the identified person meets the entry criteria, then they are authorized to enter. Otherwise, the identified person cannot enter.

In FIG. 2, if the person could not be identified or if they do not meet the entry criteria, then, the server 105 securely responds to the access request 104 with a message describing the problem.

In FIG. 2 if the identified person meets the entry criteria, server 105 securely responds to the access request 104 with a secure message including an access confirmation 107. The access confirmation 107 includes a unique secret that indicates that the person should be permitted access. In an embodiment, the confirmation 107 also includes a limited time window during which access is allowed. Next, server 105 securely forwards the access confirmation 107 and the identified person's token code in a message 108 to a computer 109 at the location's access control point. Computer 109 then saves the access confirmation in a database 110 included in computer 109. This completes the first phase of TBACS.

FIG. 3 describes the second phase of TBACS. The vehicle 102, which is not part of TBACS, and also the personal device 100 and token 101 are all shown in close proximity to computer 109 and its connected token reader 112 and access control equipment 111. This is intended to indicate that the person has arrived at the access control point. In FIG. 2, the server 105 and the server's database 106 are also show. However, there is no secure message sent during this phase, and the server 105 plays no role during the second phase. The server 105 and server's database 106 are included in FIG. 3 simply to help the reader relate FIG. 3 to FIG. 2. Also, in an embodiment, the personal device 100 plays no role in the second phase. In another embodiment, the person still has the personal device 100 and can use it to display the access confirmation in case of any communication or equipment problem that has prevented the computer 109 from having the person's access confirmation in its internal database, 110.

In FIG. 3, the person has arrived at the location's access control point with their token, 101. The token reader 112 quickly and reliably reads the token code from token 101 to enable computer 109 to retrieve the person's access confirmation 107 based on previous receipt and storage of message 108 from included database 110. In an embodiment, if the person's access confirmation can be retrieved, then the person should be permitted entry, else denied entry. In another embodiment, the person's access confirmation 107 includes a limited time window, and therefore if the computer can similarly retrieve the access confirmation 107 and the current time is within the time window, then the person should be permitted entry, else denied entry. If the person should be permitted entry, then the computer 109 sends a control signal to automated access control equipment 111 to permit physical entry, else computer 109 sends no such signal, and in that case, access control equipment 111 will not permit physical entry. This completes the second phase of TBACS.

Figure 4:
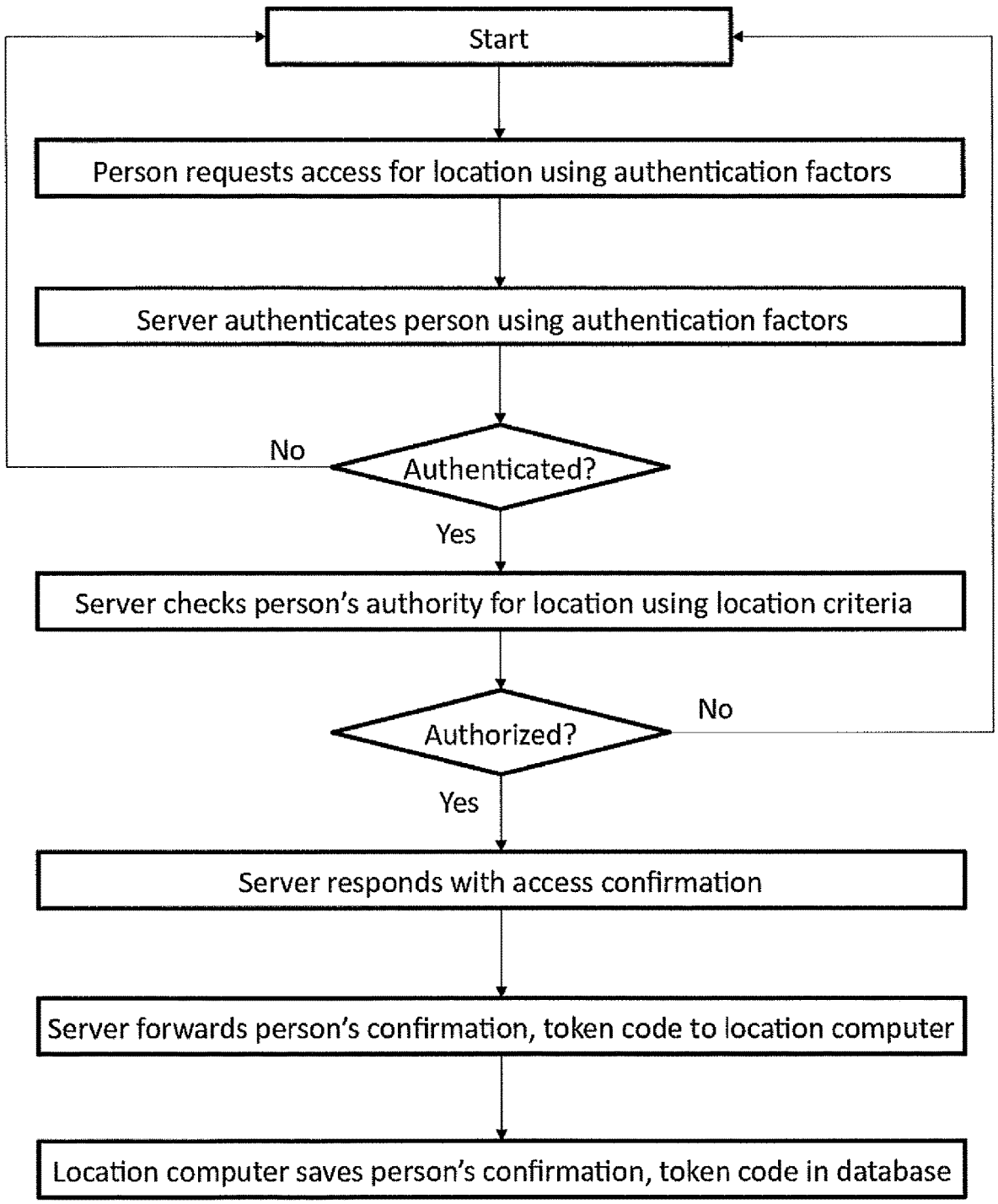
FIG. 4 illustrates the TBACS steps, Phase 1.
Figure 5:
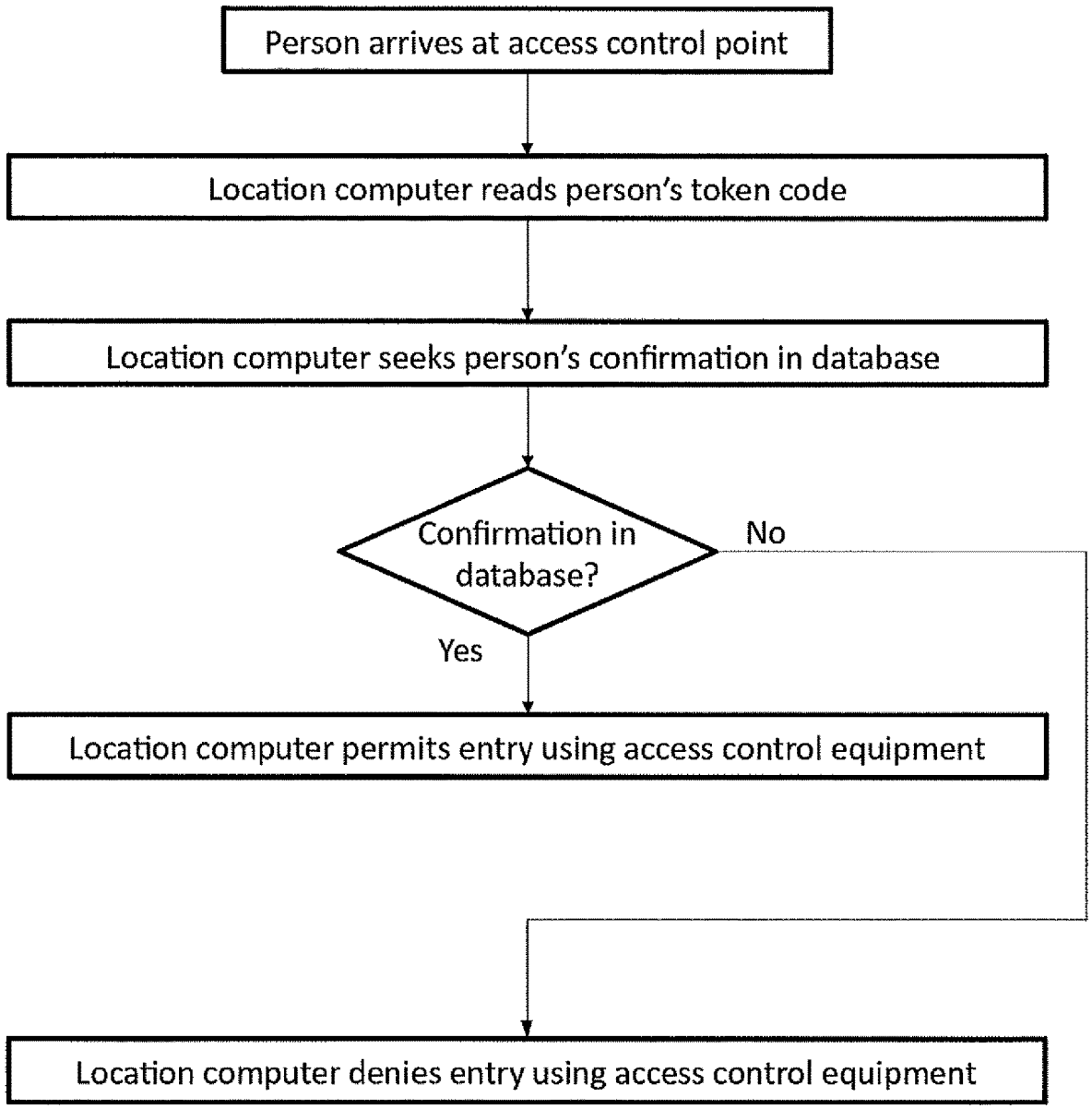
FIG. 5 illustrates the TBACS steps, Phase 2.

FIG. 4 is a flowchart showing the steps and decisions made in the first phase of TBACS. This flowchart provides a different view of concepts covered in FIG. 2 with less emphasis on system components. Similarly, FIG. 5 is a flowchart showing the steps and decisions made in the second phase of TBACS. FIG. 5 presents a different view of concepts covered in FIG. 3.

In FIG. 4, the first phase of TBACS is started by the person seeking access, in an embodiment, and the person requests access to a location by providing an identity number and authentication factors. In another embodiment, the access request is automatically made in response to an external event. Based on the access request, the server attempts to authenticate (verify the identity of) the person using the authentication factors in the access request and a preexisting database that includes authentication information for the person. If the server cannot verify the identity of the person, it responds with a message describing the problem, and then the person can correct information and start again, if desired. Otherwise, the server checks the authenticated person's authority to enter the location using criteria previously set in the preexisting database. If the authenticated person does not meet the location's criteria for entry, then the server responds with a message describing the problem, and then the person can correct information and start again, if desired. Otherwise, the server responds with an access confirmation which assures the person that they will be permitted to enter through the location's access control point. The server also forwards to the computer at the location's access control point the access confirmation as well as the person's token code which has been saved in the preexisting database. The computer stores both the access confirmation and its associated token code in its own database, facilitating easy retrieval of the access confirmation with the token code. This completes phase 1 of TBACS.

In FIG. 5, the second phase of TBACS starts when the person arrives at the access control point. This event is detected by the location computer because the person's token is automatically read. The location computer tries to retrieve the person's access confirmation from its database using the token code. If the access confirmation is found, then the location computer permits the person to physically enter using automated control equipment, else the location computer denies entry using the automated control equipment.

Although several exemplary embodiments have been disclosed, they should not be construed to be limiting of the invention in any way, as other alternative embodiments would be readily understood by one of ordinary skill in the art. The invention is defined by the appended claims.

What is claimed is:

1. A system for permitting an authorized person to securely and rapidly pass through a location's access control point by first authenticating, checking entry criteria, and, if authorized, providing an access confirmation, and second by verifying the person's confirmation upon arrival, comprising:
    a personal device that includes an interactive display and text input, secure communications capability, and a biometric sensor and enables said person to request access to a location before arriving, providing multiple authentication factors including a biometric to securely identify themselves;
    a readable token with a unique code that said person has and can be read, at the location's access control point, to identify said person;
    a network-connected server with a biometric matching algorithm and a preexisting database of authentication information necessary to verify the identity of said person as well as said person's token code and criteria, previously set by said location, for determining whether or not said person has the authority to enter said location; and
    a network-connected computer at said location's access control point, connected to a token reader and access control equipment which can physically permit said person the ability to enter said location;
    whereby, if is said person sends an access request with multiple authentication factors including a biometric for said location, said server verifies said person's identity and entry criteria, and responds with an secure access confirmation message which is also forwarded to said computer, and later, when said person arrives at the location's access control point, said computer recognizes said person by reading said token's code, checks said person's access confirmation, and permits entry using said access control equipment.

2. The system of claim 1 wherein the personal device is a mobile phone.

3. The system of claim 1 wherein the token is a radio frequency identification (RFID) tag and the token reader is an RFID reader.

4. The system of claim 1 wherein the token is a barcode and the token reader is a barcode reader.

5. A method for permitting an authorized person to securely and rapidly enter a location through the location's access control point in two phases,
    the first phase comprising:
        providing said person with a personal device that includes an interactive display and text input, secure communications capability, and a biometric sensor;
        providing said person with a readable token with a unique code;
        providing a server with a preexisting database of authentication information necessary to verify the identity of said person as well as said person's token code and criteria, previously set by said location, for determining whether or not said person has the authority to enter;
        providing a computer at said location's access control point, connected to a token reader and access control equipment which can physically permit said person the ability to enter said location;
        requesting access by said person to said location using said personal device and containing the location, the person's identity number, and multiple authentication factors including a biometric;
        authenticating said person's identity by said server using said multiple factors and a biometric matching algorithm;
        checking, by said server, said person's authority to enter said location based on said criteria;
        responding, by said server, to said person's request with a message wherein, if said person is authenticated and found to meet said access criteria, said message will be an access confirmation authorizing future access, else the message will describe a reason why said person is not authorized access;
        forwarding, if authorized access, said person's access confirmation and token code to a computer at said location's access control point;
        saving, by said computer, said person's access confirmation and token code; and
    the second phase comprising:
        arriving by said person at said location's access control point;
        reading said unique code of said person's token code by said computer's token reader;
        retrieving said person's previously saved access confirmation message; and, if found,
        permitting entry of said person through said access control point via control signals provided by said computer to automated access control equipment.

6. The method of claim 5 wherein said person shields said token to prevent a third party from reading it to maintain its token code as a secret.

7. The method of claim 5 wherein said person, upon receiving said access confirmation from said server, maintains said access confirmation as a secret.

8. The method of claim 5 wherein said access confirmation is only valid for a limited time window.

9. The method of claim 8 wherein said computer continually checks to see if an access confirmation is retrieved more than once, indicating that an unauthorized person may be attempting access or may have already entered through said location's access control point, and if so, alerting security guards of a possible security breach associated with said access confirmation.

10. The method of claim 5 wherein the biometric is a face photo of said person and said biometric matching algorithm is a facial recognition algorithm.

11. The method of claim 5 wherein the biometric is a fingerprint image of said person and said biometric matching algorithm is a fingerprint matching algorithm.

12. The method of claim 5 wherein said person arrives in a vehicle and is not required to stop before securely entering through said location's access control point.

13. The method of claim 12 wherein said person places said personal device in said vehicle in such a way as to obtain a good biometric image and wherein an external event triggers said personal device to initiate an access request for said location.

14. The method of claim 13 wherein said personal device includes a global positioning system (GPS) receiver and the external event close proximity to the location's access control point.

* * * * *